United States Patent [19]

Dittenhoefer

[11] Patent Number: 5,009,524
[45] Date of Patent: Apr. 23, 1991

[54] DOUBLE ROW, SELF ALIGNING ROLLER BEARING

[75] Inventor: Thomas Dittenhoefer, Dittelbrunn, Fed. Rep. of Germany

[73] Assignee: SKF GmbH, Schweinfurt, Fed. Rep. of Germany

[21] Appl. No.: 521,821

[22] Filed: May 10, 1990

[30] Foreign Application Priority Data

May 20, 1989 [DE] Fed. Rep. of Germany ....... 3916552

[51] Int. Cl.$^5$ ............................................. F16C 33/66
[52] U.S. Cl. .................................. 384/475; 384/551; 384/558; 384/578; 384/906
[58] Field of Search ............... 384/475, 558, 568, 578, 384/551, 572, 906

[56] References Cited

U.S. PATENT DOCUMENTS 3,314,735  4/1967  Kocian ................................. 384/475
3,845,999  11/1974 Zimmer et al. ..................... 384/558
3,957,319  5/1976  Gorski ................................. 384/568
4,824,264  4/1989  Hoebel ................................ 384/475

Primary Examiner—Lenard A. Footland
Attorney, Agent, or Firm—Eugene E. Renz, Jr.

[57] ABSTRACT

Two-row, self-aligning roller bearing comprising an outer ring with a spherical bore defining an outer raceway, an inner ring having raceways, and rollers between the rings rolling on the inner and outer raceways, these rollers having a convex lateral surface, a cage for guiding the rollers, the cage being split into two halves, each half holding one row of rollers and each half of the cage being guided in a sliding manner in the bore of the outer ring, a loose guide ring on the inner ring between the rows of rollers, a lubricant supply hole in the outer ring, the cage halves (6, 7) being located at a distance (A) from each other which is equal to or greater than the diameter of the oil supply hole (10).

5 Claims, 2 Drawing Sheets

DOUBLE ROW, SELF ALIGNING ROLLER BEARING

FIELD OF THE INVENTION

The present invention relates to improvements in double row self aligning roller bearings.

BACKGROUND OF THE INVENTION

Bearings typically comprise an outer ring with a spherical bore, an inner ring and rolling elements such as rollers which engage and roll between raceways of the inner and outer rings. The rollers have a convex lateral surface and are maintained in predetermined spaced apart relation by means of a cage which also aligns them relative to the raceways with respect to this axes of rotation. The cage is a split cage, wherein each part holds one row of rollers and wherein each half of the cage is guided in a sliding manner in the bore of the outer ring. A loose guide ring is provided on the inner ring between the rows of rollers. A self lining roller bearing of this type is shown in West German Patent No. 848,125. This bearing has certain disadvantages and drawbacks. For example, the cooling effect of the lubricant on the inner ring is limited because of the shielding effect of the cage.

SUMMARY OF THE INVENTION

With the foregoing in mind, it is an object of the present invention to provide a novel improvement in double row spherical bearings which increases the service life of the bearing even under extreme operating conditions such as exposure to high thermal stress. To this end and in accordance with the present invention, the cage halves are separated from one another by a distance equal to or greater than the diameter of the lubricant supply bore in the outer ring. For this arrangement, the circulation of lubricant can be greatly increased to a point where a large amount of heat can be dissipated from the inner ring. Further, this means that the oil in the lubricating gap retains a high viscosity which ensures a long service life of the bearing.

In accordance with another feature of the invention, the outer diameter of the loose guide ring is made as small as functionally possible so that the oil can flow unhindered between the cage halves and the loose guide flange.

BRIEF DESCRIPTION OF THE DRAWINGS

These and other objects of the present invention and the various features and details of the operation and construction thereof are hereinafter more fully set forth with reference to the accompanying drawings, wherein.

DETAILED DESCRIPTION OF THE PREFERRED EMBODIMENT

Figure 1:
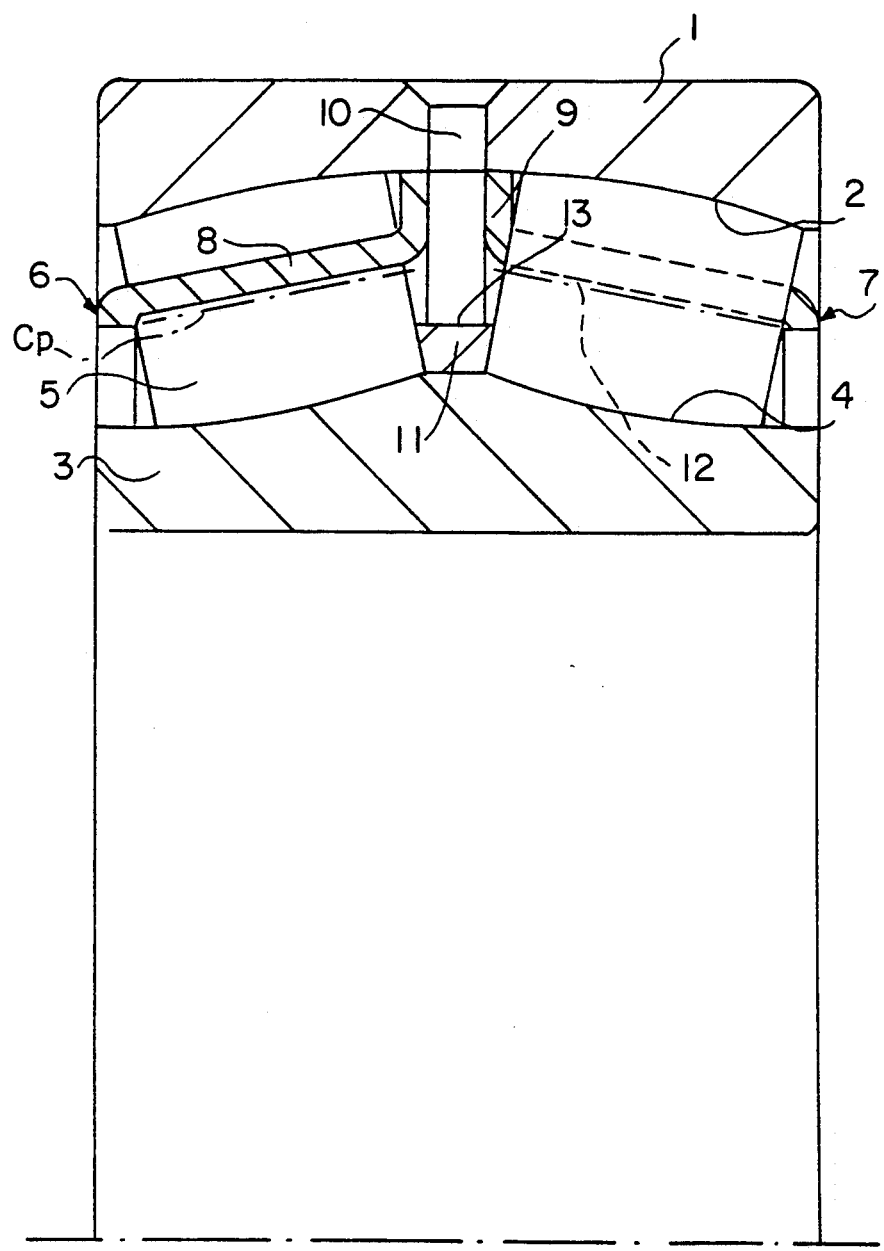
FIG. 1 is a transverse cross sectional view of a double row self aligning roller bearing in accordance with the present invention.
Figure 2:
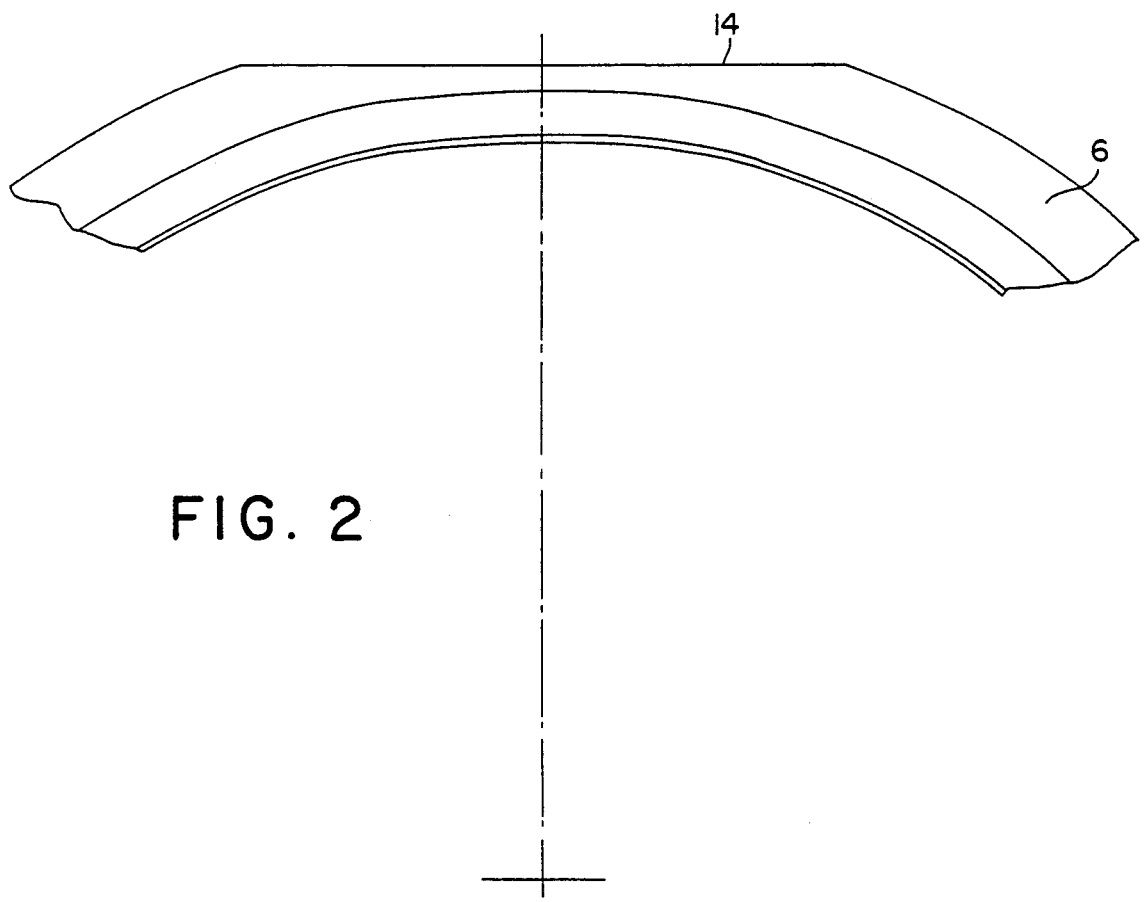
FIG. 2 shows a fragmentary side view of part of the cage shown in FIG. 1.

Referring now to the drawing, and in particularly to FIG. 1 thereof, there is shown a self aligning roller bearing constructed in accordance with the present invention. As illustrated, the bearing comprises an outer ring 1 having a spherical bore surface defining an outer raceway 2, an inner ring 3 having a pair of side by side spherical raceways 4 and a plurality of rollers 5 arranged in side by side rows in the annular space between the rings. The bearing assembly further includes a window type cage made of metal such as steel or a similar stiff heat resistant material divided radially into halves 6 and 7, each half supporting one of the rows of rollers 5. The cage includes a plurality of circumferentially spaced cage webs 8 which engage between adjacent rollers above the pitch circle $C_p$ and are separated from each other in a peripheral direction by a distance D which is smaller than the diameter D1 (not shown) of a roller 5.

The cage halves 6 and 7 are provided on their confronting side faces with radially outwardly directed flanges 9 which rest against the bore surface 2 of the outer ring and serve as guide means for the cage halves 6 and 7. The distance A between the cage halves 6 and 7 is preferably equal to or greater than the diameter D2 of the oil supply hole 10 in the outer ring 1 so that a stream of lubricant such as oil is conducted without obstruction across the inner ring 3.

In accordance with another feature of the present invention, the outer diameter D3 of the loose guide ring flange 11 is of a predetermined small dimension so that the distance between the bore surface 12 of the cage halves 6 and 7 and the lateral surface 13 of a loose guide flange can be made as large as possible. By reason of the squeezing effect of rollers 5 and the turbulent flow of lubricant along the inner ring raceways 4 a better heat transfer coefficient is obtained. Moreover, the amount of circulating oil required is very small. The lateral surface of the flange 9 has two diametrically opposed flattened areas 14 parallel to each other and are separated by a distance L which is slightly smaller than the smallest bore diameter $D_b$ of the outer ring 1. By this arrangement, the cage halves during assembly can be pushed into the outer ring 1 in a position rotated by 90° and then turned to assume their operating position.

Even though particularly embodiments of the invention have been illustrated and described herein, it is not intended to limit the invention and changes and modifications may be made therein within the scope of the following claims.

What is claimed is:

1. Two-row, self-aligning roller bearing comprising an outer ring with a spherical bore defining an outer raceway, an inner ring having raceways, and rollers between the rings rolling on said inner and outer raceways, these rollers having a convex lateral surface, a cage for guiding the rollers, said cage being split into two halves, each half holding one row of rollers and each half of the cage being guided in a sliding manner in the bore of the outer ring, a loose guide ring on the inner ring between the rows of rollers, a lubricant supply hole in said outer ring, the cage halves (6, 7) being located at a distance (A) from each other which is equal to or greater than the diameter of the oil supply hole (10).

2. Two-row, self-aligning roller bearing according to claim 1, wherein the outer diameter of the loose guide ring (11) is as small as functionally possible, and the distance between bore surfaces (12) and lateral surface (13) of loose guide ring (11) be as large as possible.

3. Two-roll self-aligning roller bearing according to claim 1, the cage halves (6, 7) have flanges (9) on their facing end surfaces, the lateral surfaces of which slide on the bore surfaces (2) of the outer ring (1).

4. Two-row, self-aligning roller bearing according to claim 1, characterized in that the cage webs (8) are provided above the pitch circle.

5. Two-row, self-aligning roller bearing according to claim 1, including two diametrically opposing flattened areas (14) on the lateral surfaces of the cage flange (9), said surfaces being parallel to each other and separated from each other by a distance which is slightly smaller than the smallest bore diameter of the outer ring (1).

* * * * *